(12) United States Patent
Pace et al.

(10) Patent No.: US 8,879,902 B2
(45) Date of Patent: Nov. 4, 2014

(54) INTEGRATED 2D/3D CAMERA WITH FIXED IMAGING PARAMETERS

(75) Inventors: Vincent Pace, Shadow Hills, CA (US); Patrick Campbell, Stevenson Ranch, CA (US)

(73) Assignee: Vincent Pace & James Cameron, Burbank, CA (US)

( * ) Notice: Subject to any disclaimer, the term of this patent is extended or adjusted under 35 U.S.C. 154(b) by 97 days.

(21) Appl. No.: 13/444,657

(22) Filed: Apr. 11, 2012

(65) Prior Publication Data

US 2012/0195583 A1 Aug. 2, 2012

Related U.S. Application Data

(63) Continuation-in-part of application No. PCT/US2010/052025, filed on Oct. 8, 2010.

(51) Int. Cl.
*G03B 35/00* (2006.01)
*H04N 13/02* (2006.01)
*G03B 35/08* (2006.01)

(52) U.S. Cl.
CPC .............. *G03B 35/08* (2013.01); *H04N 13/025* (2013.01); *H04N 13/0296* (2013.01); *H04N 13/0242* (2013.01)
USPC ........................................................ 396/326

(58) Field of Classification Search
USPC ........................................................ 396/326
See application file for complete search history.

(56) References Cited

U.S. PATENT DOCUMENTS

| | | | |
|---|---|---|---|
| 4,881,122 A * | 11/1989 | Murakami | ...................... 348/47 |
| 5,465,128 A | 11/1995 | Wah Lo et al. | |
| 5,699,108 A | 12/1997 | Katayama et al. | |
| 5,737,655 A | 4/1998 | Inaba | |
| 5,801,760 A | 9/1998 | Uomori | |
| 5,974,272 A | 10/1999 | Kiesow et al. | |
| 5,978,015 A | 11/1999 | Ishibashi et al. | |
| 6,160,607 A | 12/2000 | Diaconu | |
| 6,388,666 B1 | 5/2002 | Murray | |
| 6,512,892 B1 * | 1/2003 | Montgomery et al. | ....... 396/326 |

(Continued)

FOREIGN PATENT DOCUMENTS

| | | |
|---|---|---|
| EP | 1085769 A2 | 3/2001 |
| GB | 2168565 A | 6/1986 |
| JP | 3179438 A | 8/1991 |
| JP | 2004504631 A | 2/2004 |

OTHER PUBLICATIONS

European Patent Office, Supplementary European Search Report and Written Opinion for European Application No. 10823871.8, mail date Feb. 7, 2013.

(Continued)

*Primary Examiner* — Clayton E LaBalle
*Assistant Examiner* — Linda B Smith
(74) *Attorney, Agent, or Firm* — SoCal IP Law Group LLP; John E. Gunther; Steven C. Sereboff (57) ABSTRACT

There is disclosed an integrated 2D/3D camera system which may include a 2D camera and a 3D camera affixed to the 2D camera. An inter-camera convergence angle between the 2D camera and the 3D camera may be preset. At least some imaging parameters of one of the 2D camera and the 3D camera may be preset. Imaging parameters of the other of the 2D camera and the 3D camera may be remotely controllable.

23 Claims, 6 Drawing Sheets

(56) References Cited

U.S. PATENT DOCUMENTS

| | | | |
|---|---|---|---|
| 6,701,081 B1 | 3/2004 | Dwyer et al. | |
| 6,909,457 B1 | 6/2005 | Fukasawa | |
| 7,031,512 B2 | 4/2006 | Ng | |
| 7,218,342 B2 | 5/2007 | Kobayashi et al. | |
| 7,388,598 B2* | 6/2008 | Lee et al. | 348/42 |
| 7,551,272 B2 | 6/2009 | Vodanovic | |
| 8,243,123 B1* | 8/2012 | Geshwind et al. | 348/42 |
| 8,482,600 B2* | 7/2013 | Lee | 348/47 |
| 2001/0056477 A1 | 12/2001 | McTernan et al. | |
| 2002/0012043 A1 | 1/2002 | Guerin et al. | |
| 2002/0158984 A1* | 10/2002 | Brodsky et al. | 348/340 |
| 2005/0238208 A1* | 10/2005 | Sim | 382/115 |
| 2006/0055817 A1* | 3/2006 | Ito | 348/362 |
| 2007/0103675 A1 | 5/2007 | Vodanovic | |
| 2007/0247614 A1 | 10/2007 | Puah et al. | |
| 2008/0007567 A1 | 1/2008 | Clatworthy et al. | |
| 2008/0123938 A1 | 5/2008 | Kim | |
| 2008/0158345 A1 | 7/2008 | Schklair et al. | |
| 2009/0060273 A1 | 3/2009 | Stephan et al. | |
| 2009/0262184 A1 | 10/2009 | Engle et al. | |
| 2010/0049392 A1* | 2/2010 | Vlaar et al. | 701/28 |
| 2010/0077960 A1* | 4/2010 | Van Den Berg et al. | 119/14.17 |
| 2010/0322477 A1* | 12/2010 | Schmitt et al. | 382/103 |
| 2011/0149041 A1* | 6/2011 | Eccles et al. | 348/46 |
| 2011/0292227 A1* | 12/2011 | Nakazawa | 348/218.1 |

OTHER PUBLICATIONS

Japan Patent Office, Notice of Reasons for Rejection for Japanese application No. 2012-534248, mail date Jan. 22, 2013.

21st Century3d.com, "21st Century 3D Introduces Uncompressed 4:4:4 Stereoscopic Camera System-3DVX3", SPIE Stereoscopic Displays and Applications Conference; avail. Http://www.21stcentury3d.com/press/pr-060117-3dvx3.html; printed Sep. 11, 2008, 3 pages.

FullCamera.com, "21st Century 3D Introduces New Digital Steroscopic Motion Picture Camera System", http://fullcamera.com/article/cfm/id1281457, printed Sep. 11, 2008, 2 pages.

Hurwitz, Matt, "Dreaming in 3D", CineGear Expo News, The Official CineGear Expo Show Newspaper, Jun. 3-5, 2005, pp. 23-24.

World Intellectual Property Organization, International Search Report and Written Opinion for International Application No: PCT/US10/52025, mail date Nov. 19, 2010, pp. 1-5.

* cited by examiner

INTEGRATED 2D/3D CAMERA WITH FIXED IMAGING PARAMETERS

RELATED APPLICATION INFORMATION

This patent is a continuation-in-part of International Application No. PCT/US2010/52025, entitled INTEGRATED 2D/3D CAMERA, filed Oct. 8, 2010, which claims priority from patent application Ser. No. 12/578,171, entitled INTEGRATED 2D/3D CAMERA, filed Oct. 13, 2009, now U.S. Pat. No. 7,929,852 B1, both of which are incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to stereoscopy.

2. Description of the Related Art

Humans view the environment three-dimensionally using binocular vision. Binocular vision is both a visual system and an analytical system. Our brain perceives both distance and speed based, in part, on triangulating visual light information received by the retinas of our respective laterally separated, forward facing eyes. Since both eyes are forward facing, the fields of view of each of our eyes overlap, with each eye perceiving a slightly different perspective of the same area. As we focus on objects closer to our eyes, our eyes rotate towards each other. As we focus on distant objects, our eyes rotate towards a parallel view. The angle between the lines of sight of each eye is commonly termed the convergence angle. The convergence angle is higher when we view objects closer to our eyes and lower when viewing distance object. The convergence angle may be essentially zero, indicating essentially parallel lines of sight, when we view objects at great distance.

Three dimensional (3D) imaging, also known as stereographic imaging, dates at least as far back as 1838. Historically, stereographic cameras commonly include two lenses spaced laterally apart a similar distance as an average human's eyes, approximately 65 mm. The effective distance of the lenses from each other is known as the interocular distance. The interocular distance has a strong effect on the apparent depth of a stereographic image. Increasing the interocular spacing increases the apparent depth of a stereographic image. Decreasing the interocular spacing has the effect of decreasing the apparent depth of a stereographic image.

The presentation of stereoscopic images is commonly achieved by providing a first image to be seen only by the left eye and a second image to be seen only by the right eye. Differences, or disparity, between the two images may provide an illusion of depth. Two images having disparity may be perceived as three-dimensional. Two images, or portions of two images, exhibiting excessive disparity may not be perceived as three-dimensional, but may simply be seen as two overlapping two-dimensional images. A variety of techniques, including polarization, filters, glasses, projectors, and shutters have been used to restrict each eye to viewing only the appropriate image.

One approach to displaying stereographic images is to form the left-eye image on a viewing screen using light having a first polarization state and to form the right-eye image on the same viewing screen using light having a second polarization state orthogonal to the first polarization state. The images may then be viewed using glasses with polarizing lenses such that the left eye only receives light of the first polarization state and the right eye only receives light of the second polarization state. Stereoscopic displays of this type typically project the two polarized images onto a common projection screen. This technique in now commonly used to present 3D movies.

A second approach to displaying stereographic images is to form the left-eye and right-eye images alternately on a common viewing screen at a high rate. The images may then be viewed using shutter glasses that alternately occult either the right or left eye in synchronism with the alternating images. This technique in now used in consumer 3D television sets.

Throughout this description, elements appearing in schematic views and block diagrams are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator. Elements that have similar functions for either the left or right eyes are assigned the same reference designator with a suffix of either "L" or "R" to indicate left-eye or right-eye, respectively.

DETAILED DESCRIPTION

Description of Apparatus

Figure 1:
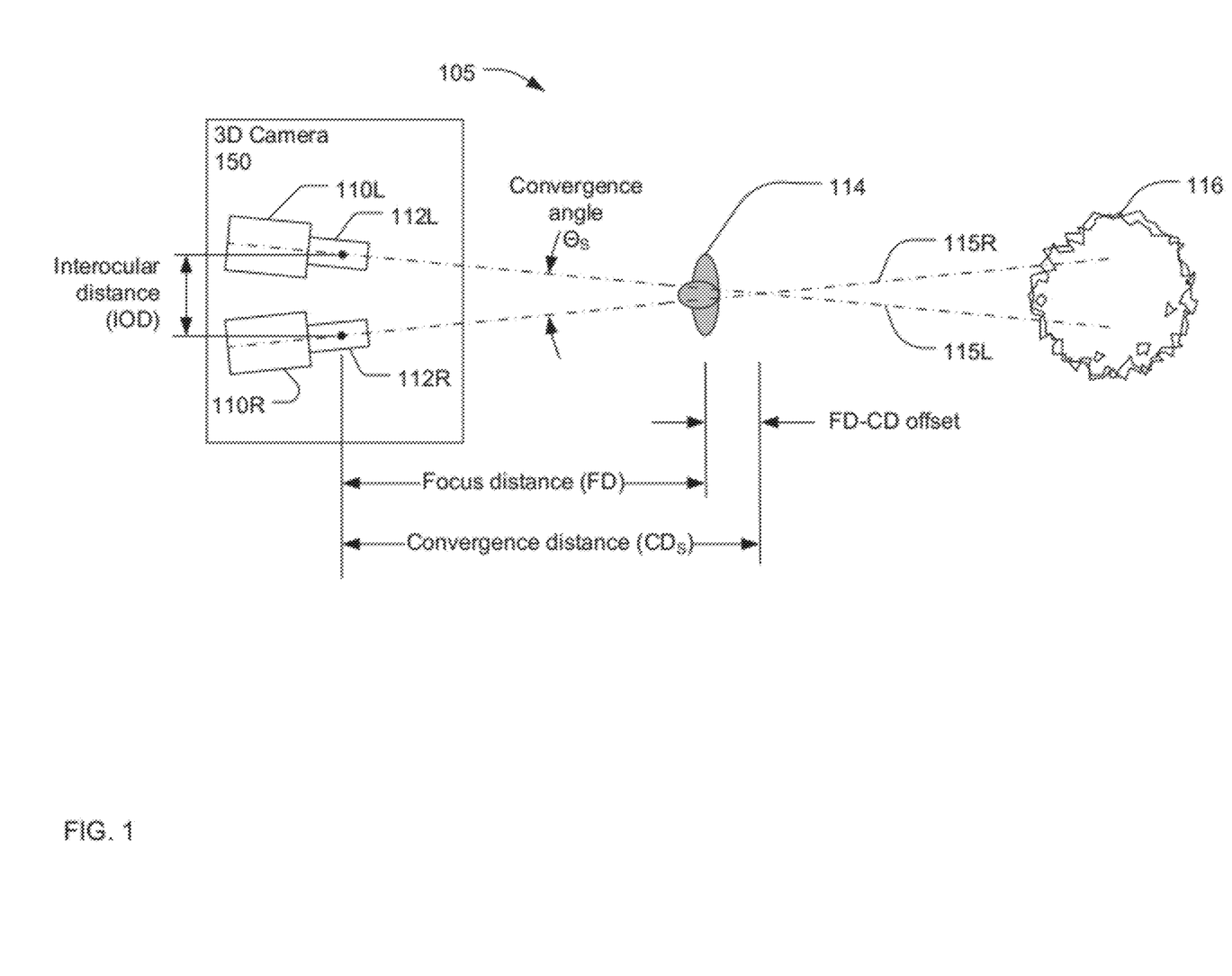
FIG. 1 is a schematic view of a stereographic camera in an environment.

Referring now to FIG. 1, a 3D, or stereographic, camera 150 may include a left camera 110L and a right camera 110R. The term "camera" is intended to include any device having an optical system to form an image of an object and a medium to receive and detect and/or record the image. The left and right cameras may be film or digital still image cameras, may be film or digital motion picture cameras, or may be video cameras. Each of the left and right cameras 110L, 110R may include a lens 112L, 112R. The term "lens" is intended to include any image-forming optical system and is not limited to combinations of transparent refractive optical elements. A lens may use refractive, diffractive, and/or reflective optical elements and combinations thereof. Each lens may have an axis 115L, 115R that defines the center of the field of view of each camera 110L, 110R.

In this patent, the function of a camera is to "capture" a scene either by recording the scene on film or by converting the scene into electronic signals and/or data that may be stored and/or broadcast.

The left and right cameras 110L, 110R may be separated by an interocular distance IOD. The cameras 110L, 110R may be disposed such that the axis 115L, 115R are parallel or such that a stereo convergence angle $\Theta_S$ is formed between the two axes 115L, 115R. The cameras 110L, 110R may be disposed such that the axis 115L, 115R cross at a stereo convergence distance $CD_S$ from the cameras. The interocular distance IOD, the stereo convergence distance $CD_S$, and the stereo convergence angle $\Theta_S$ are related by the formula $$\Theta_S = 2\, \text{ATAN}(IOD/2CD_S), \tag{1}$$

or $$CD_S = IOD/[2\, \text{TAN}(\Theta_S/2)]. \tag{2}$$

The interocular distance IOD and the stereo convergence distance $CD_S$ may be measured from a nodal point within the lenses 112L, 112R, which may be the center of an entrance pupil of each lens 112L, 112R.

The stereographic camera 150 may be used to form a stereographic image of a scene 105. As shown in the simplified example of FIG. 1, the scene 105 may include a primary subject 114, which is shown, for example, as a person. The scene 105 may also include other features and objects in the background (behind the primary subject 114) or the foreground (between the camera and the primary subject 114). When the images from a stereographic camera, such as the 3D camera 150, are displayed on a viewing screen, scene objects at the convergence distance will appear to be in the plane of the viewing screen. Scene objects, such as the primary subject 114 in the example of FIG. 1, located closer to the stereographic camera may appear to be in front of the viewing screen. Scene objects, such as the tree 116, located further from the stereographic camera may appear to be behind the viewing screen.

Each lens 112L, 112R may have adjustable focus. The lenses 112L, 112R may be focused at a common adjustable focus distance FD. The focus distance FD may be adjusted manually or may be automatically adjusted. The focus distance FD may be adjusted such that the cameras 110L, 110R are focused on the primary subject 114. The focus distance may be automatically adjusted in response to a sensor (not shown) that determines the distance from the cameras 110L, 110R to the primary subject 114. The sensor to determine the distance from the cameras to the primary subject 114 may be an acoustic range finder, an optical or laser range finder, or some other distance measuring device. In the case where the cameras 110L, 110R are digital still image, motion picture, or video cameras, the focus distance may be adjusted in response to one or more processors (not shown) that analyze one or both of the images sensed by the cameras. The processors may be located within or may be coupled to the cameras.

The convergence distance CD and the focus distance FD may commonly be set to the same distance, which may be the distance from the cameras 110L, 110R to the primary subject 114. However, as shown in FIG. 1, the convergence distance CD and the focus distance FD may not be the same distance. For example, the focus distance FD may be set at the distance from the cameras to the primary subject and the convergence distance CD may be set slightly longer than the focus distance. In this case, when the images are displayed, the primary subject will be seen to be in front of the plane of the viewing screen.

Each lens 112L, 112R may also have zoom capability, which is to say that the focal length FL of each lens may be adjustable. The focal lengths of the lenses 112L, 112R may be adjusted manually or automatically. The focal lengths of the lenses 112L, 112R may be adjusted synchronously such that focal lengths of the lenses are precisely the same at all times. The focal lengths of the lenses 112L, 112R may be adjustable over a predetermined continuous range of focal lengths.

Figure 2:
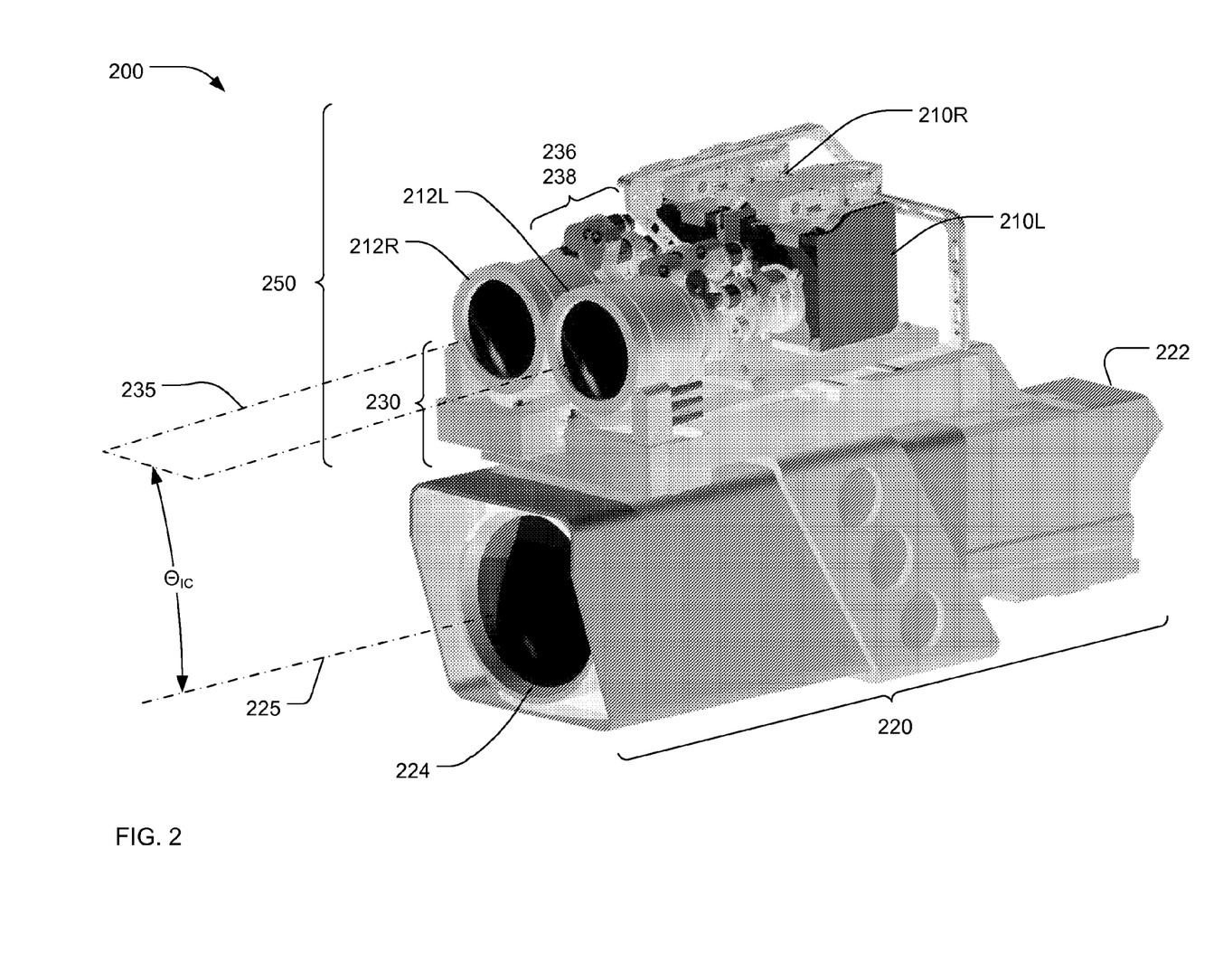
FIG. 2 is a perspective view of an exemplary integrated 2D/3D camera.

Referring now to FIG. 2, an integrated 2D/3D camera system may include a 3D camera 250 affixed, or attached physically, to a 2D camera 220. In FIG. 2, the 3D camera 250 in disposed on top of the 2D camera 220. Other configurations, for example with a 3D camera below or alongside a 2D camera, are possible.

The 3D camera 250 may include left and right cameras 210L, 210R, each of which may have an associated lens 212L, 212R. The left and right cameras 210L 210R may be disposed in fixed positions with respect to each other such that an interocular distance and a convergence angle between the left and right cameras 210L, 210R are fixed. The left and right cameras 210L 210R may be supported by a motion platform 230. When present, the motion platform 230 may provide for adjustment of the interocular distance and the convergence angle between the left and right cameras 210L, 210R. The motion platform 230 may provide for adjustment of an inter-camera convergence angle between a line of sight of the 3D camera 250 and a line of sight of the 2D camera 220.

The 3D camera lenses 212L, 212R may be fixed focal length lenses. The 3D camera lenses 212L, 212R may be variable focal length or "zoom" lenses. When zoom lenses are used, the 3D camera 250 may include a zoom mechanism 238 to adjust a focal length of the left and right lenses 212L, 212R. The 3D camera lenses 212L, 212R may have a fixed focus distance or a variable focus distance. When variable focus distance lenses are used, the 3D camera 250 may include a focus mechanism 236 to adjust a focus distance of the left and right lenses 212L, 212R. The 3D camera may include an aperture mechanism (not identified) to adjust an aperture setting of the left and right lenses 212L, 212R.

In this patent, the term "mechanism" refers to a combination of mechanical, electrical, and/or electromechanical components, including at least one component movable with respect to other components. The relative motion may be linear, angular, a combination or linear and angular, or some other movement. The movable components may be coupled by rotary or linear slides, bearings, bushings, or other devices. Movement of the movable components may be effected by an actuator such as a motor or a manually operated lever, knob, crank, ring, or other device. The actuator may be all or a portion of one of the movable components, or may be coupled to the movable components by way of one or more gears, belts, links, and other devices. Movement of the movable components may be effected manually, with or without the assistance of tools. Examples of mechanisms include motorized linear or rotational motion stages and manual or motorized systems currently used to adjust focus and aperture on cinematic camera lenses.

The 2D camera 220 may include a camera head 222 and a lens 224. The 2D camera lens 224 may be a fixed focal length lens or a variable focal length or lens. When the 2D camera lens 224 is a zoom lens, the 2D camera 220 may include a zoom mechanism (not visible) to adjust a focal length of the 2D camera lens 224. The 2D camera lens 224 may have a fixed focus distance or a variable focus distance. When a variable focus distance lens is present, the 2D camera 220 may include a focus mechanism (not visible) to adjust a focus distance of the 2D camera lens 224. The 2D camera may include an aperture mechanism (not visible) to adjust an aperture setting of the 2D camera lens 224.

The 2D camera 220 and the 3D camera 250 may be vertically displaced as shown in FIG. 2. An integrated 2D/3D camera may include a 2D camera and a 3D camera that are horizontally adjacent, or displaced in some other direction. The 2D camera 220 and the 3D camera 250 may be disposed such that an axis of the 2D camera lens 224 is parallel to a plane defined by the axes of the 3D camera lenses 212L, 212R, or such that an inter-camera convergence angle $\Theta_{IC}$ is formed between the axis of the 2D camera lens 224 and the plane defined by the axes of the 3D camera lenses. The inter-camera convergence angle $\Theta_{IC}$ may be such that the axis 225 of the 2D camera lens 224 intersects the plane 235 defined by the axes of the 3D camera lenses 212L, 212R at an inter-camera convergence distance $CD_{IC}$ from the cameras.

Figure 3:
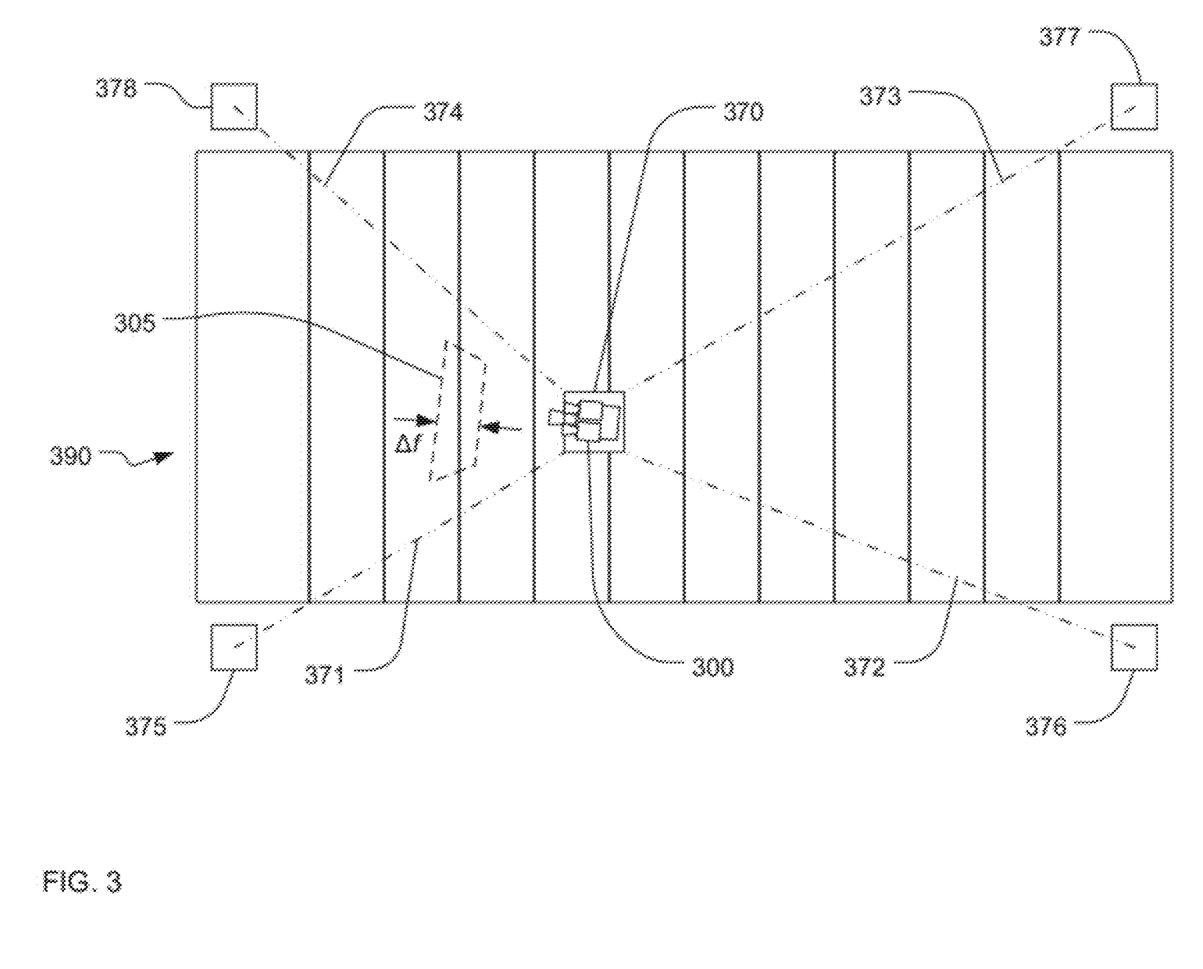
FIG. 3 is a schematic top view of an integrated 2D/3D camera in a venue.

Referring now to FIG. 3, a remotely-operated integrated 2D/3D camera 300, which may be the integrated 2D/3D camera 200, may be mounted to a highly mobile platform and used to capture live events. In the example of FIG. 3, the integrated 2D/3D camera 300 is depicted mounted on a SKY-CAM® platform produced by Winnercom, Incorporated. A SKYCAM® provides a computer-controlled stabilised camera platform 370 suspended by four cables 371, 372, 373, 374, each of which is connected to a respective computer-controlled winch 375, 376, 377, 378. The camera platform 370 may be positioned at any point over a venue 390 by adjusting the relative lengths of the cables 371-374 using the respective winches 375-378. Once in position, the integrated 2D/3D camera 300 may be aimed at an object of interest using a pan and tilt mechanism incorporated into the camera platform 370. In the example of FIG. 3, the venue 390 is depicted as an American football field, but could be, for further example, a soccer or rugby field, a basketball court, or ice hockey rink, an arena, an auditorium, or another venue. In FIG. 3, the physical size of the integrated 2D/3D camera 300 is shown greatly enlarged relative to the size of the venue 390. A SKYCAM® is an example of a highly mobile platform, and the integrated 2D/3D camera 300 may be mounted on other highly mobile platforms.

When an integrated 2D/3D camera is mounted to a highly mobile platform, it may be necessary to limit the weight of the camera and/or restrict the number of signals and cables that are brought on or off the camera platform. To this end, one or both of the 2D camera and the 3D camera of the integrated 2D/3D camera 300 may have preset imaging parameters. In this context, the term "imaging parameters" means the camera parameters and settings that control what portion of a scene is captured by a camera. Imaging parameters include the focus distance and focal length of camera lenses and, for 3D cameras, the interocular distance and convergence angle between left and right cameras. In this patent, the term "preset" means a parameter is either fixed or adjusted prior to the use of a camera to capture an event. For example, the focal length of a lens is considered "preset" if the focal length is fixed by the construction of the lens, or if the focal length of a variable focal length (zoom) lens is adjusted to a specific value prior to the use of the camera. A preset parameter may be manually adjusted prior to use of a camera and then remain unchanged during use of the camera. In this context the term "fixed" means invariable, as in the case of a fixed focal length lens (as opposed to a variable focal length or zoom lens).

When an integrated 2D/3D camera is mounted to a highly mobile platform, the focal length and focus distance of the 2D camera lens may be preset, thus avoiding the weight of zoom and focus mechanisms and the need to route zoom and focus control signals to the camera platform. Alternatively or additionally, the focal length and focus distance of the lenses of the left and right cameras of the 3D camera may be preset, and the interocular distance and convergence angle between the left and right cameras may be preset, thus avoiding the weight of zoom, focus, interocular, and convergence mechanisms and the need to route associated control signals to the camera platform.

When the imaging parameters of a camera are preset, the camera may provide a quality image only of scene objects within a limited quality imaging volume 305, which represented in FIG. 3 by a dashed trapezoid. The extent of the quality imaging volume 305 normal to the line of sight of the camera is determined by the field of view of the camera. The field of view may be determined, in turn, primarily by the size of the image sensor within the camera and the focal length of the camera lens. The depth along the line of sight of the camera of the quality imaging volume 305 may be effectively determined by the depth of focus $\Delta f$ of the camera. The depth of focus of the camera may be determined, in turn, primarily by the focus distance and aperture setting of the camera lens. Of course the camera will still capture scene objects that are in front of or behind the quality imaging volume, but with imperfect focus.

When the imaging parameters of a camera are preset, a highly mobile platform may be used to move the camera such that scene objects of interest are encompassed by the quality imaging volume 305 of the camera. For example, when capturing an American football game, the imaging parameters of a 2D and/or 3D camera may be preset such that the quality imaging volume 305 will accommodate the offensive linemen, the quarter back, and the running backs. The camera may then be positioned, using the highly mobile platform, appropriately behind the quarterback at the start of each play. For further examples, imaging parameters of a camera may be preset to accommodate all or a portion of a live performance stage, or a region surrounding the goal when capturing either hockey or soccer.

To provide flexibility when capturing live events, the imaging parameters of one camera of the integrated 2D/3D camera 300 may be fixed, while the imaging parameters of the other camera may be variable and remotely controllable. For example, the focus distance, focal length, interocular distance, and convergence angle of the 3D camera may be fixed, and the focus distance and focal length of the 2D camera may be remotely controllable. In this case, the integrated 2D/3D camera 300 may be positioned such that the quality imaging volume 305 of the 3D camera contains a desired portion of the action within the venue 390, and the focus distance and focal length of the 2D camera may be controlled to capture an image that is wider or narrower than the image captured by the 3D camera.

In this patent, "remotely controllable" means capable of being controlled by data received from a controller or other source remote from the integrated 2D/3D camera 300. Within this patent, the term "data" is intended to include digital data, commands, instructions, digital signals, analog signals, optical signals and any other data that may be used to communicate the value of an imaging parameter such as focus distance or focal length.

Figure 4:
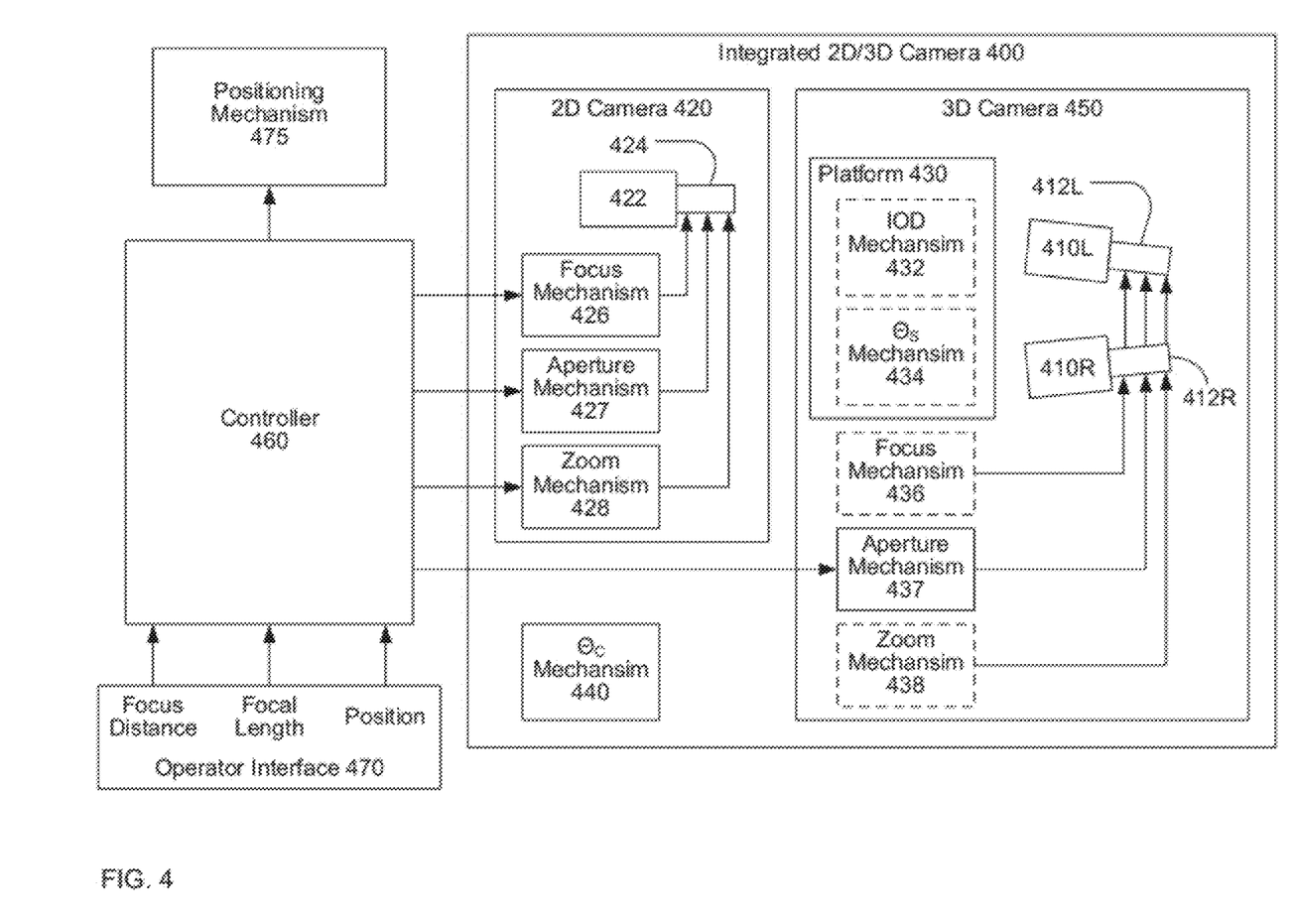
FIG. 4 is a block diagram of an integrated 2D/3D camera.

Referring now to FIG. 4, an integrated 2D/3D camera 400, which may be the integrated 2D/3D camera system 200, may include a 2D camera 420, a 3D camera 450, and an inter-camera convergence ($\Theta_{IC}$) mechanism 440. The integrated 2D/3D camera 400 may be mounted on a positioning mechanism 475 and may be coupled to a controller 460. All or portions of the controller 460 may be remote from the integrated 2D/3D camera 400.

The 2D camera may include a camera head 422 and a lens 424. For ease of discussion the focus distance, the focal length, and the aperture of the lens 424 of the 2D camera 420 will be referred to as the "2D focus distance", "the 2D focal length", and the "2D aperture" respectively. The 2D focal length may be fixed and/or the 2D focus distance may be fixed. Alternatively, the 2D camera 420 may include a focus mechanism 426 and/or a zoom mechanism 428 for setting the 2D focus distance and/or the 2D focal length, respectively. The 2D camera 420 may include an aperture mechanism 427 to adjust the 2D aperture. The focus mechanism 426, the zoom mechanism 428, and the aperture mechanism 427 may include motors or other actuators adapted to set the 2D focus distance, 2D focal length, and 2D aperture, respectively, in response to data received from the controller 460. The focus mechanism 426, the zoom mechanism 428, and the aperture mechanism 427 may include manually-adjusted actuators to preset the 2D local length, 2D focus distance, and/or 2D aperture, which may then remain constant while the camera is used to capture an event.

The 3D camera 450 may include a left camera 410L and a right camera 410R, each of which has an associated lens 412L, 412R. For ease of discussion the focus distance, the focal length, and the aperture of the lenses 412L, 412R of the 3D camera 450 will be referred to as the "3D focus distance", "the 3D focal length", and the "3D aperture" respectively. The 3D focal length may be fixed and/or the 3D focus distance may be fixed. Alternatively, the 3D camera 450 may include a focus mechanism 436 and/or a zoom mechanism 438 for setting the 3D focus distance and/or the 3D focal length, respectively. The 3D camera 450 may include an aperture mechanism 437 to adjust the 3D aperture. The focus mechanism 436, the zoom mechanism 438, and the aperture mechanism 437 may include motors or other actuators adapted to set the 3D focus distance, 3D focal length, and 3D aperture, respectively, in response to data received from the controller 460. The focus mechanism 426, the zoom mechanism 428, and the aperture mechanism 427 may include manually-adjusted actuators to preset the 3D focal length, 3D focus distance, and/or 3D aperture, which may then remain fixed while the camera is used to capture an event.

The relative position of the cameras 410L and 410R with respect to each other may be fixed. Alternatively, the 3D camera 450 may include a motion platform 430. The motion platform 430 may include an IOD mechanism 432 to adjust an interocular distance between the left camera 410L and the right camera 410R. The motion platform 430 may include a $\Theta_S$ mechanism 434 to adjust a convergence angle between the left camera 410L and the right camera 410R by pivoting one or both cameras about respective pivot axes. The IOD mechanism 432, and the $\Theta_S$ mechanism 434 may include one or more movable platforms or stages coupled to motors or other actuators to set the interocular distance and the stereo convergence angle, respectively, in response to data received from the controller 460. The IOD mechanism 432 and the $\Theta_S$ mechanism 434 may include manually-adjusted actuators. Such manually-adjusted actuators may be used, for example, to preset the interocular distance and/or convergence angle, which may then remain fixed while the camera is used to capture an event.

The inter-camera convergence angle ($\Theta_{IC}$) mechanism 440 may adjust an inter-camera convergence angle between the 2D camera 420 and the 3D camera 450. For example, the inter-camera convergence angle ($\Theta_{IC}$) mechanism 440 may be used to adjust the inter-camera convergence angle such that the axis of the 2D camera lens 424 intersects the plane defined by the axes of the 3D camera lenses 412L, 412R at an inter-camera convergence distance $CD_{IC}$ from the cameras. This enables the 2D camera 420 and 3D camera 450 to simultaneously record or broadcast 2D and 3D images centered on the same subject within the scene.

The inter-camera convergence angle ($\Theta_{IC}$) mechanism 440 may include one or more movable platforms or stages coupled to motors or other actuators to set the inter-camera convergence distance in response to data received from the controller 460. The inter-camera convergence angle ($\Theta_{IC}$) mechanism 440 may include a manually-adjusted actuator to preset the inter-camera convergence distance, which may then remain fixed while the camera is used to capture an event.

One of the 2D camera 420 and the 3D camera 450 may have remotely-controlled variable imaging parameters, and the other of the 2D camera 420 and the 3D camera 450 may have fixed or preset imaging parameters. For example, the focus mechanism 426, aperture mechanism 427 and zoom mechanism 428 of the 2D camera 420 and the aperture mechanism 437 of the 3D camera 450 may be controlled by data received from a controller 460 remote from the integrated 2D/3D camera 400. The IOD mechanism 432, convergence angle mechanism 4343, focus mechanism 436, and zoom mechanism 438 (dashed rectangles in FIG. 4) may be fixed and/or manually preset.

The positioning mechanism 475 may adjust the position of the integrated 2D/3D camera 400 in response to data received from the controller 460. The positioning mechanism may adjust the position of the integrated 2D/3D camera 400 with five degrees of freedom including a location of the camera in three-dimensional space, a pan angle, and a tilt angle. The positioning mechanism 475 may be distributed. For example, when the positioning mechanism 475 is or includes a SKY-CAM® as depicted in FIG. 3, the positioning mechanism may include four cables 371-374, four computer-controlled winches 375-378, and a camera platform 370 incorporating a pan and tilt mechanism.

The controller 460 may be coupled to an operator interface 470. The operator interface 470 may be configured to allow one or more operators to remotely control the operation of the integrated 2D/3D camera 400 and the positioning mechanism 475. The operator interface 470 may be configured to accept operator commands to control the positioning mechanism including commands defining the location, pan angle, and tilt angle of the integrated 2D/3D camera 400. The controller 460 may convert operator commands received via the operator interface 470 into data to control the positioning mechanism 475.

The operator interface 470 may be configured to also accept operator commands to control the imaging parameters of one of the 2D camera 420 and the 3D camera 450. Continuing the previous example, the operator interface 470 may accept focal length and/or focus distance commands defining a desired focal length and focus distance for the 2D camera lens 424. The controller 460 may then convert the focus distance and/or focal length commands into data to cause the focus mechanism 426 and the zoom mechanism 428 to set the focus distance and/or focal length of the 2D camera lens 224 accordingly.

The operator interface may also be configured to accept operator commands defining a desire aperture for the 2D camera lens 224 and/or the 3D camera lenses 412L, 412R. The controller 460 may then convert the aperture commands into data to cause the 2D aperture mechanism 427 and/or the 3D aperture mechanism 437 to set the aperture of the 2D camera lens 224 and/or the apertures of the 3D camera lenses 412L, 412R accordingly. The controller 460 may automatically generate data to control the 2D aperture mechanism 427 and/or the 3D aperture mechanism 437 based on analysis of video signals output by the 2D camera and/or the 3D camera. Portions of the controller responsible for automatic aperture control may be integrated into the 2D camera 420 and/or the 3D camera 450.

Figure 5:
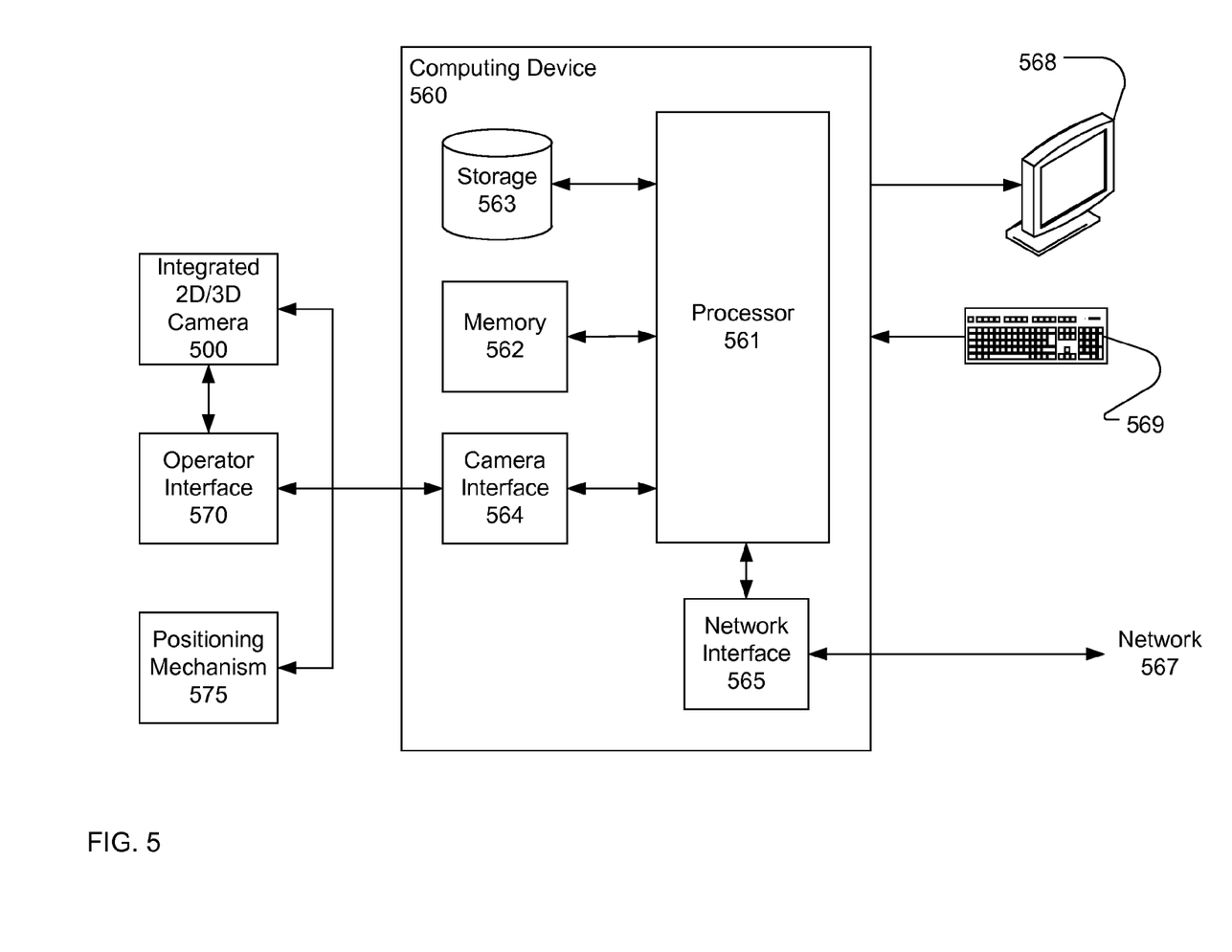
FIG. 5 is a block diagram of a computing device.

FIG. 5 is a block diagram of a computing device 560 that may be suitable for the controller 460. As used herein, a computing device refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. The computing device 560 may include hardware, firmware, and/or software adapted to perform the processes subsequently described herein. The computing device may include a processor 561 coupled to a memory 562 and a storage device 563.

The storage device 563 may store instructions which, when executed by the computing device 560, cause the computing device to provide the features and functionality of the controller 460. As used herein, a storage device is a device that allows for reading from and/or writing to a storage medium. Storage devices include hard disk drives, DVD drives, flash memory devices, and others. Storage media include, for example, magnetic media such as hard disks, floppy disks and tape; optical media such as compact disks (CD-ROM and CD-RW) and digital versatile disks (DVD and DVD±RW); flash memory cards; and other storage media. The term "storage medium" does not encompass transitory media such as signals and propagating waveforms.

The computing device 560 may include or interface with a display device 568 and one or more input devices such a keyboard 569. The computing device 560 may also include a network interface unit 565 to interface with one or more networks 567. The network interface unit 565 may interface with the network 567 via a wired or wireless connection. The network 567 may be or include the Internet or any other private or public network.

The computing device 560 may also include a camera interface unit 564 to interface with an integrated 2D/3D camera 500, a camera operator interface 570, and a positioning mechanism 575. The camera interface unit 564 may include a combination of circuits, firmware, and software to interface with the integrated 2D/3D camera 500, the camera operator interface 570, and the positioning mechanism 575. The camera interface unit 564 may be coupled to the integrated 2D/3D camera 500, the camera operator interface 570, and the positioning mechanism 575 via a network which may be a local area network, via one or more buses such as a USB bus, a PCI bus, a PCI Express bus, or other parallel or serial data bus, or via one or more direct wired or wireless connections. The camera interface unit 564 may be coupled to the integrated 2D/3D camera 500, the camera operator interface 570, and the positioning mechanism 575 via a combination of one or more of direct connections, network connections, and bus connections.

The processes, functionality and features of the computing device 560 may be embodied in whole or in part in software which may be in the form of firmware, an application program, an applet (e.g., a Java applet), a browser plug-in, a COM object, a dynamic linked library (DLL), a script, one or more subroutines, or an operating system component or service. The computing device 560 may run one or more software programs as previously described and may run an operating system, including, for example, versions of the Linux, Unix, MS-DOS, Microsoft Windows, Palm OS, Solaris, Symbian, and Apple Mac OS X operating systems. The hardware and software and their functions may be distributed such that some functions are performed by the processor 561 and others by other devices.

Description of Processes

Figure 6:
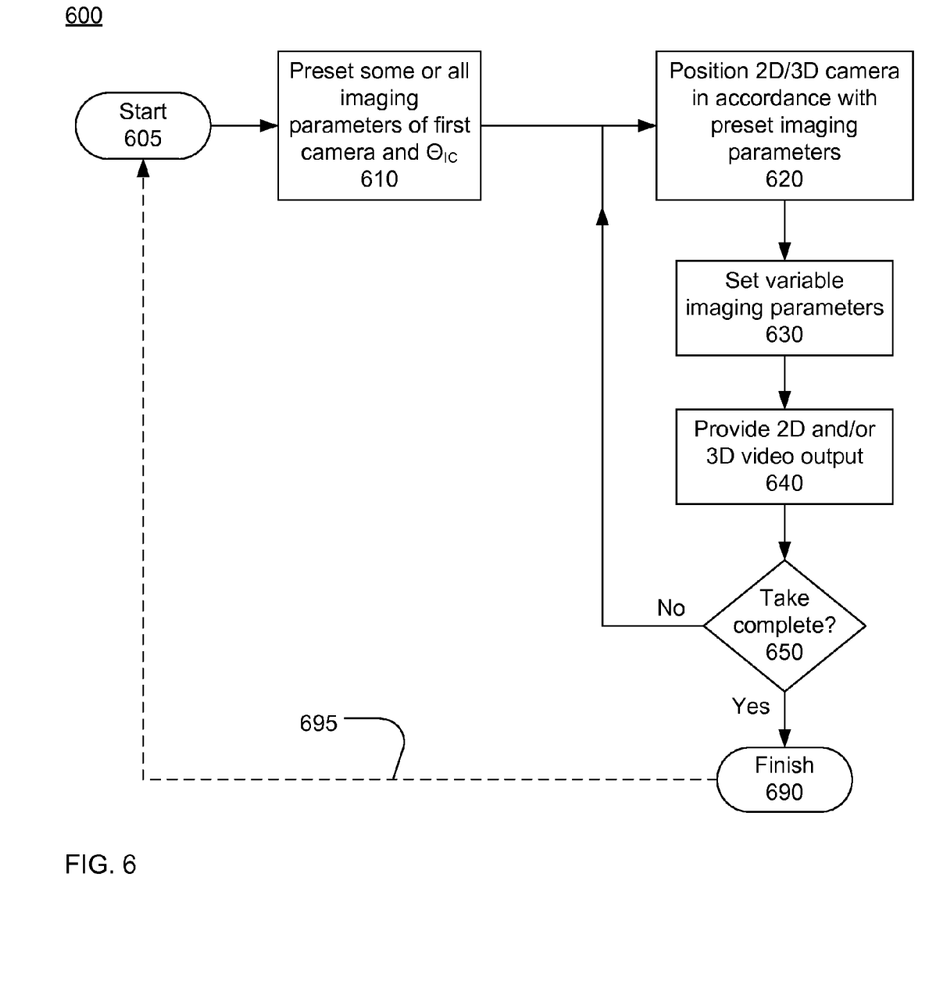
FIG. 6 is a flow chart of a process for operating an integrated 2D/3D camera.

FIG. 6 is a flow chart of an exemplary process 600 for operating an integrated 2D/3D camera including a first camera with preset imaging parameters and a second camera with remotely controllable imaging parameters. The first camera may be either of a 2D camera or a 3D camera within the integrated 2D/3D camera. For example, the process 600 may be suitable for operating the integrated 2D/3D camera 400 configured such that the interocular distance, the stereo convergence angle, 3D focus distance, and 3D focal length are fixed or manually preset.

FIG. 6 is a flow chart of a process 600 for a single take, wherein within this patent a "take" is defined as continuous or discontinuous image capture using a specific configuration of a camera (i.e. without changing any fixed or preset imaging parameters of the camera). The process 600 has a start 605 and a finish at 690 when the take is complete. A live event, such as a sporting event, may be captured as a single take. The process 600 may be repeated, as indicated by the dashed line 695, for each of a large plurality of scenes that may constitute, for example, a motion picture or television program. The process 600 is continuous in nature and the actions 620-650 within the process may be performed continuously and in near-real time during the capture of each take.

Within this patent, the phrase "near-real time" means in real time except for processing delays that are very short compared with temporal events in the scene being captured.

At 610, an operator, such as a cameraman or camera technician, may preset some or all imaging parameters for the first camera. The preset imaging parameters may include, for example, a preset focus distance and/or a preset focal length. When the first camera is the 3D camera, the preset imaging parameters may also include a preset interocular distance, and a preset convergence angle. Some or all preset imaging parameters may be fixed or non-adjustable and thus preset by design. Some or all preset imaging parameters may be set by selection of appropriate camera components such as, for example, selection of specific fixed-focal length lens or lenses. Some or all preset imaging parameters may be set by manual adjustment. The present imaging parameters may define, at least in part, a quality imaging volume for the first camera.

An inter-camera convergence angle $\Theta_{IC}$ may also be preset at 610. The inter-camera convergence angle may be preset, for example such that an axis of a lens of the 2D camera lens intersects the plane defined by axes of left and right lens within the 3D camera within the quality imaging volume of the first camera. The inter-camera convergence angle may be preset, for example such that an axis of a lens of the 2D camera lens intersects the plane defined by axes of left and right lens within the 3D camera at the center of the quality imaging volume of the first camera.

When the first camera is the 2D camera, at 610, the focal length may be preset by manual adjustment of a zoom mechanism, or by selection and installation of an appropriate fixed focal length lens. Similarly, the focus distance may be preset by manual adjustment of a focus mechanism or by lens selection.

When the first camera is the 3D camera, at 610, the focal length may be preset by manual adjustment of a zoom mechanism, or by selection and installation of an appropriate pair of fixed focal length lenses. Similarly, the focus distance may be preset by manual adjustment of a focus mechanism or by lens selection. The interocular distance, and a convergence angle may be fixed in the design of the 3D camera or preset by manual adjustment.

After the imaging parameters of the first camera are preset at 610, a take may be captured by the integrated 2D/3D camera. To capture a take, at 620, the integrated 2D/3D camera may be positioned in accordance with the preset imaging parameters of the first camera, which is to say positioned such that object of interest is within or encompassed by a quality imaging volume of the first camera. Positioning the integrated 2D/3D camera at 620 may include moving the camera to a desired location in three-dimensional space and setting a pan angle and a tilt angle.

At 630, variable imaging parameters of the integrated 2D/3D camera may be set consistent with the position of the integrated 2D/3D camera. The variable imaging parameters set at 620 may include a focus distance, focal length, and/or an aperture of the lens or lenses of the second camera and/or an aperture of the lens or lenses of the first camera. When the second camera is the 3D camera, the variable imaging parameters set at 620 may include an interocular distance and/or a convergence angle of the left and right cameras within the 3d camera. The variable imaging parameters set at 620 may be set in response to data received by the integrated 2D/3D camera from a controller located remotely from the integrated 2D/3D camera. The data may be received by the integrated 2D/3D camera form the remote controller via a wired or wireless connection.

At 640, video outputs from the 2D camera and/or the 3D camera may be provided to a video capture system remote from the integrated 2D/3D camera. The video capture system may record, process, transmit, and or broadcast the video outputs from the 2D camera and/or the 3D camera.

At 650, a determination may be made if the take is complete, in which case the process 600 may end at 690. When a determination is made at 650 that the take will continue, the actions at 620-650 may be repeated continuously and in near-real time until the take is completed.

As described above, the process 600 is intended to simultaneously capture both 2D and 3D images using both the first camera and the second camera of an integrated 2D/3D camera system. However, events are commonly captured using a plurality of cameras distributed about a venue. At any moment, the image captured by one, both, or neither of the 2D and 3D cameras may actually be recorded or broadcast. In situations where only the image captured by the second camera (i.e. the camera with controllable imaging parameters) will be used, the 2D/3D camera may be positioned at 620 to capture the desired image with the second camera without regard for the content or quality of the image captured by the first camera.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. An integrated 2D/3D camera system, comprising:
a 2D camera including a 2D lens; and
a stereographic 3D camera affixed to the 2D camera, the 3D camera comprising left and right cameras including respective left and right lenses, wherein
an inter-camera convergence angle between an axis of the 2D lens and a plane defined by the axes of the left and right lenses is preset,
at least some imaging parameters of one of the 2D camera and the 3D camera are preset, and
imaging parameters of the other of the 2D camera and the 3D camera are variable and remotely controllable.

2. The integrated 2D/3D camera system of claim 1, wherein at least some imaging parameters of the 3D camera are preset and imaging parameters of the 2D camera are variable and remotely controllable.

3. The integrated 2D/3D camera system of claim 2, wherein the preset imaging parameters of the 3D camera include one or more of a focus distance of the left and right lenses, a focal length of the left and right lenses, an interocular distance, and a stereo convergence angle.

4. The integrated 2D/3D camera system of claim 3, wherein the preset imaging parameters of the 3D camera include all of the focus distance of the left and right lenses, the focal length of the left and right lenses, the interocular distance, and the stereo convergence angle.

5. The integrated 2D/3D camera system of claim 2, wherein the variable and remotely controllable imaging parameters of the 2D camera include one or more of a focus distance of the 2D lens, a focal length of the 2D lens, and a aperture of the 2D lens.

6. The integrated 2D/3D camera system of claim 2, wherein an aperture of the left and right lenses is variable and remotely controllable.

7. The integrated 2D/3D camera system of claim 1, wherein
at least some imaging parameters of the 2D camera are preset and imaging parameters of the 3D camera are variable and remotely controllable.

8. The integrated 2D/3D camera system of claim 7, wherein the preset imaging parameters of the 2D camera include a focus distance of the 2D lens, a focal length of the 2D lens.

9. The integrated 2D/3D camera system of claim 7, wherein the variable and remotely controllable imaging parameters of the 3D camera include one or more of a focus distance of the left and right lenses, a focal length of the left and right lenses, an aperture of the left and right lenses, an interocular distance, and a stereo convergence angle.

10. The integrated 2D/3D camera system of claim 9 wherein the variable and remotely controllable imaging parameters of the 3D camera include all of the focus distance of the left and right lenses, the focal length of the left and right lenses, the aperture of the left and right lenses, the interocular distance, and the stereo convergence angle.

11. The integrated 2D/3D camera system of claim 7, wherein an aperture of the 2D lens is variable and remotely controllable.

12. A method for operating an integrated 2D/3D camera, the integrated 2D/3D camera comprising a 2D camera including a 2D lens affixed to a stereographic 3D camera including left and right cameras with respective left and right lenses, the method comprising:
    mounting the integrated 2D/3D camera on a highly mobile platform;
    presetting an inter-camera convergence angle between an axis of the 2D lens and a plane defined by the axes of the left and right lenses;
    presetting imaging parameters of one of the 2D camera and the 3D camera, the preset imaging parameters defining, at least in part, a quality imaging volume;
    positioning the integrated 2D/3D camera using the highly mobile platform such that the quality imaging volume encompasses a subject of interest; and
    remotely controlling variable imaging parameters of the other of the 2D camera and the 3D camera.

13. The method for operating an integrated 2D/3D camera of claim 12, further comprising repeating the positioning and remotely controlling to capture an event.

14. The method for operating an integrated 2D/3D camera of claim 12, wherein
    presetting imaging parameters comprises presetting at least some imaging parameters of the 3D camera, and
    remotely controlling comprises remotely controlling variable imaging parameters of the 2D camera.

15. The method for operating an integrated 2D/3D camera of claim 14, wherein presetting imaging parameters of the 3D camera comprises presetting one or more of a focus distance of the left and right lenses, a focal length of the left and right lenses, an interocular distance, and a convergence angle.

16. The method for operating an integrated 2D/3D camera of claim 15, wherein presetting imaging parameters of the 3D camera comprises presetting all of the focus distance of the left and right lenses, the focal length of the left and right lenses, the interocular distance, and the convergence angle.

17. The method for operating an integrated 2D/3D camera of claim 14, wherein remotely controlling variable imaging parameters of the 2D camera comprises remotely controlling one or more of a focus distance of the 2D lens, a focal length of the 2D lens, and an aperture of the 2D lens.

18. The method for operating an integrated 2D/3D camera of claim 14, further comprising remotely controlling an aperture of the left and right lenses.

19. The method for operating an integrated 2D/3D camera of claim 12, wherein
    presetting imaging parameters comprises presetting at least some imaging parameters of the 2D camera, and
    remotely controlling comprises remotely controlling variable imaging parameters of the 3D camera.

20. The method for operating an integrated 2D/3D camera of claim 19, wherein presetting imaging parameters of the 2D camera comprises presetting a focus distance of the 2D lens and a focal length of the 2D lens.

21. The method for operating an integrated 2D/3D camera of claim 19, wherein remotely controlling variable imaging parameters of the 3D camera comprises remotely controlling one or more of a focus distance of the left and right lenses, a focal length of the left and right lenses, an aperture of the left and right lenses, an interocular distance, and a convergence angle.

22. The method for operating an integrated 2D/3D camera of claim 21, wherein remotely controlling variable imaging parameters of the 3D camera comprises remotely controlling all of the focus distance of the left and right lenses, the focal length of the left and right lenses, the aperture of the left and right lenses, the interocular distance, and the convergence angle.

23. The method for operating an integrated 2D/3D camera of claim 19, further comprising remotely controlling an aperture of the 2D lens.

* * * * *